3,515,537
POLYCHLORO-α-HYDROXYBENZYLPHOSPHONIC
AND PHOSPHINIC DERIVATIVES AS PLANT
GROWTH CONTROL AGENTS
Edward D. Weil, Yonkers, Edwin Dorfman, Grand
Island, and Jerome Linder, Niagara Falls, N.Y.,
assignors to Hooker Chemical Corporation, Niagara Falls, N.Y., a corporation of New York
No Drawing. Original application Mar. 14, 1966, Ser. No. 533,792. Divided and this application Nov. 29, 1967, Ser. No. 701,798
Int. Cl. A01n 9/36, 13/00
U.S. Cl. 71—86          6 Claims This is a division of the parent application Ser. No. 533,792, filed Mar. 14, 1966.

This invention is concerned with new and useful compositions of matter known as polychlorinated-alpha-hydroxybenzylphosphonic and phosphinic acids and esters thereof.

The compounds of the invention are described by the general formula

where at least one and a maximum of two of the substituents X, Y and Z is

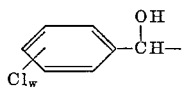

where $w$ is an integer from two to five, and the remaining substituents are selected from the group consisting of hydrogen, alkoxy, aryloxy, and no more than one hydroxy. The new compounds of the invention are high boiling liquids or solids.

It is preferred that there be three chlorine substituents on the benzene ring. Thus, the α-hydroxytrichlorobenzyl substituents may have the chlorine atoms in the 2,3,4-, 2,3,5-, 2,3,6-, 2,4,5-, 2,4,6- or 3,4,5- configuration. However the di-, tetra-, penta- chlorobenzyl compounds are also to be included within the scope of this invention including the 2,3-, 2,4-, 2,5-, 2,6-, 3,4-, 3,5- 2,3,4,5-, 2,3,4,6-, 2,3,5,6-, and 2,3,4,5,6- configurations.

The compounds of the invention bearing a single α-hydroxypolychlorobenzyl group are designated as α-hydroxypolychlorobenzylphosphonic acids and derivatives thereof, and the compounds of the invention bearing two α-hydroxypolychlorobenzyl groups are designated as bis α - hydroxypolychlorobenzyl) phosphinic acids and derivatives.

The lower alkoxy substituents which may be present in the compounds of the invention have from one to twelve carbon atoms. Representatives among these may be methoxy, ethoxy, propoxy, isopropoxy, butoxy, sec-butoxy, isobutoxy, amyloxy, hexyloxy, cyclohexyloxy, octyloxy, decycloxy, lauryloxy, and the like. Also included are lower alkoxy groups substituted by halogen, as for example 2-chloroethoxy, also lower alkoxy groups substituted by a hydroxy, such as 2-hydroxyethoxy, also lower alkoxy groups substituted by a lower alkoxy, such as 2-ethoxyethoxy, also lower alkoxy groups substituted by an aryl group, such as benezyloxy. As examples of aryloxy groups which may be present as substituents may be named phenoxy, cresoxy, chlorophenoxy, naphthoxy, and the like. Alkyl and alkoxy groups used herein have 1-12 carbon atoms.

The compounds of the invention bearing a hydroxy and/or a hydrogen group on the phosphorus atom are acids and as such readily form salts, such as the sodium, potassium, calcium, zinc, copper, ammonium, alkylammonium, dimethylammonium, trimethylammonium, and other lower alkylammonium salts, such salts being included within the scope of the invention, with the water-soluble salts being preferred.

The compounds of the invention are preferably synthesized by the reaction of phosphorous acid, hypophosphorous acid, or an ester thereof with the polychlorobenzaldehyde.

An advantage of the novel method of this invention is that it lends itself to the use of various grades of purity, by itself or in combination with other biologically active compositions. For example, these herbicidal compositions offer the advantage of compatibility with a host of other herbicides including the tri- and tetrachlorophenylacetic acids and the sodium borates and calcium borates, 2,4-D and other herbicidal phenoxy aliphatic acids and esters, simazine and other herbicidal triazines, monuron, fenuron, diuron and other herbicidal ureas, herbicidal chlorates, herbicidal petroleum oils, hexachlorocyclopentadiene, pentachlorophenol, dinitro-o-alkylphenols, sodium trichloroacetate and sodium 2,2-dichloropropionate, and with various adjuvants and diluents well known to the art. Thus, these herbicides may be used by themselves or made the subject of liquid or solid formulations ranging from the very simple to the most elegant. For example, if it is desired these compositions may be made the subject of a liquid formualtion by diluting, dispersing, dissolving or emulsifying with a surface active adjuvant or combination of these adjuvants in organic solvents such as petroleum hydrocarbons, alcohols, ketones, esters, glycols or combination thereof. Or alternatively, the novel herbicides may be made up as solid formulations of powders, dusts, wettable dusts, granules and pellets using solid diluents such as talcs, clays, flours, starches, diatomaceous earths, mica, alkaline earth limes, carbonates and phosphates either finely divided, granular or pelleted in form.

These solid and liquid formulations facilitate handling and application and sometimes enhance herbicidal activity to more than an additive degree.

The liquid compositions, whether solutions or dispersions of the active agents in a liquid solvent and also the wettable powder or dust compositions of this invention may contain as a conditioning agent one or more surface active agents in amounts sufficient to render the composition readily dispersible in water. By the term surface active agents are included wetting agents, dispersing agents, emulsifying agents and the like. A satisfactory but not complete list of such agents is set forth in an article in "Soap and Chemical Specialties," vol. 31, No. 7, pages 50–61; No. 8, pages 48–61; No. 9, pages 52–67, and No. 10, pages 38 (67) 1955. Other sources of adjuvant materials is set forth in Bulletin E–607 of the Bureau of Entomology and Plant Quarntine of the United States Department of Agriculture.

While the manner and method of application of the inventive compositions is varied and largely dependent upon the climatic conditions, crop treated, the weeds to be eradicated, the equipment available and the convenience of the user, a preferred embodiment of this invention is to apply our new herbicide as a spray after making it up as a liquid formulation comprised of several times its weight of a petroleum hydrocarbon solvent such as petroleum naphtha, kerosene, diesel oil, xylene, "weed oil," fuel oil, etc., optionally with small quantities of an emulsifier such as a commercial polyoxyethylene ether and a surfactant such as alkylaryl sulfonate mixture. This type of mixture is either sprayed without further dilution or emulsified with water and sprayed on the weed population or on the soil where weed growth is to be prevented.

The rate of application of the inventive herbicidal composition cannot be precisely stated due to varying degrees of resistance possessed by the weed species and crop, the stage of weed and crop growth, the soil type and climatic conditions, but in general, the rates will be at least one-quarter of a pound of herbicide per acre and for reasons of cost will seldom exceed four hundred pounds per acre with the preferred falling within five-tenths to fifty pounds per acre. Where the weeds or brush are in an early stage of growth, they being more susceptible, will frequently respond to the rates from one-half to eight pounds per acre while older weeds or brush that are to be totally eradicated may require rates in excess of ten pounds per acre. In those instances where well established brush is encountered or where the weed population has been allowed to accumulate unchecked or where mature plants are encountered, applications of up to fifty and even beyond this rate may be required. For eradication of deeply-rooted herbicide-resistant perennial weeds such as field bind-weed or for long term sterillization rates of ten pounds up to several hundred pounds per acre may be necessary.

The compound of the invention may also be employed at sublethal rates to produce stunting of plants. For example, the growth of brush under power lines may be retarded in this way.

The compositions are most effective when applied as a pre-emergent herbicide, although the compositions can be applied post-emergent, as well.

To illustrate the preparation of these compounds, the following examples are given.

EXAMPLE 1

Dimethyl-α-hydroxy-2,3,6-trichlorobenzylphosphonate

A mixture of 21 parts of 2,3,6-trichlorobenzaldehyde and 15 parts of dimethyl phosphite

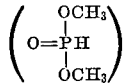

was heated under reflux by steam at 100° C. for 24 hours. The mixture was then washed with hexane and dissolved in benzene. On cooling and partial evaporation, a colorless solid crystallized out and was removed by filtration, to obtain 25 parts of product, 139.5–140.5° C. The infrared spectrum revealed a hydroxyl but no carboxyl group.

*Analysis.*—Calculated for $C_9H_{10}Cl_3O_4$ (percent): Cl, 33.3. Found (percent): Cl, 32.7.

EXAMPLE 2

Bis(α-hydroxy-2,3,6-trichlorobenzyl)phosphinic acid

A mixture of 42 parts of 2,3,6-trichlorobenzaldehyde and 93 parts of hypophosphorous acid (calculated on 100% basis) was heated for 6 hours at 90–105° C. under nitrogen. The cooled product was triturated with water, filtered, dissolved in 3 percent aqueous caustic, filtered and reprecipitated with excess hydrochloric acid. The product was filtered, washed with water and dried to obtain 36 parts of colorless crystalline solid, M.P. 179–183° C. Titration with 0.1 N NaOH to form the soluble sodium salt showed a neutraliziation equivalent of 490 (theory 483).

*Analysis.*—Calculated for $C_{14}H_9Cl_6PO_2$ (percent): Cl, 44.1. Found (percent): Cl, 43.2.

EXAMPLE 3

Diethyl-α-hydroxy-2,3,6-trichlorobenzylphosphonate

A mixture of 21 parts of 2,3,6-trichlorobenzaldehyde and 18 parts of diethyl phosphite was heated at 100° C. for 20 hours. The mixture was then crystallized from a benzene-hexane mixture to obtain 20 parts of a colorless gummy solid having the proper analysis for the desired adduct.

*Analysis.*—Calculated for $C_{11}H_{14}O_4PCl_3$ (percent): Cl, 31.5. Found (percent): Cl, 30.2.

EXAMPLE 4

Diethyl-α-hydroxy-2,3,6- and 2,4,5-trichlorobenzyl phosphonate

A mixture of 21 parts of a technical trichlorobenzaldehyde, analyzing 80–90% 2,3,6- and 10–20% 2,4,5-trichlorobenzaldehyde, by infrared, was reacted with diethyl phosphite as in Example 3 to obtain a mixed diethyl-α-hydroxytrichlorobenzylphosphonate, a gummy colorless semi-solid.

*Analysis.*—Calculated for $C_{11}H_{14}O_4PCl_3$ (percent): Cl, 31.5. Found (percent): Cl, 30.5.

EXAMPLE 5

Diphenyl-α-hydroxy-2,3,6-trichlorobenzylphosphonate

A mixture of 21 parts of 2,3,6-trichlorobenzaldehyde and 25 parts of diphenyl phosphite was heated at 100° C. for 24 hours. The resultant mixture, glassy upon cooling, was leached with hot hexane to remove any unreacted starting materials. The remaining material was a light gray solid, M.P. 53–56° C. The infrared spectrum showed a hydroxyl but no carboxyl group.

*Analysis.*—Calculated $C_{19}H_{14}O_4Cl_3P$ (percent): Cl, 24.1. Found (percent): Cl, 25.9.

The new compounds of the invention have utility as chemical intermediates, as pesticides, and as fire retardant ingredients of resins and polymers.

Other polymers in which the composition of this invention may be incorporated include the polyesters, alkyds and paint vehicles, such as bodied linseed oil, nylon, diallyl phthalates and phthalates, isocyanates and polycarbonates. Polycarbonates are thermoplastic resins formed from a dihydroxy compound and a carbonate diester. The more important commercial polycarbonates are made from para, paraisopropylidenediphenol and phosgene. Polyesters are thermoplastic resins produced by the reaction of dibasic acids and dihydroxy compounds. The unsaturated polyesters can be further polymerized by crosslinking. Alkyds are in many respects similar to polyesters, but alkyds utilize unsaturated fatty acids. Resins within the scope of this invention include the condensation reaction products of phenol and aldehyde, e.g., novolacs and thermoplastic polymers of bis-(4-hydroxyphenyl)-2,2-propane and epichlorohydrin (trade name of phenoxy). The polymeric compositions and coatings of this invention include high molecular weight polymers and resins as well as the intermediate molecular weight materials utilized for coatings and paints. The polymers embraced within the scope of this invention include the homopolymers and copolymers of unsaturated aliphatic, alicyclic, and aromatic hydrocarbons. The most common of these are formed from ethylene, propylene, butadiene and styrene.

They have been found to have surprising activity as herbicides, as shown by the following example:

EXAMPLE 6

An area seeded with corn, and having a natural infestation of broad-leaf weeds, predominantly ragweed, lambsquarters and pigweed, was sprayed pre-emergence with the products of Examples 1–5 at the rate of 8 pounds per acre. In the case of the products of Examples 1, 3, 4 and 5, the active ingredient was first dissolved in 3–5 parts of xylene and emulsified with water using Atlox 3335P, a commercial non-ionic emulsifier. The product of Example 2 was dissolved in water as the sodium salt. In each case, except with the product of Example 2, the corn germinated and grew normally, while the broad-leaf weeds were totally controlled. The product of Example 2 gave complete weed control at 8 pounds per acre but also corn damage; however, at 2 pounds per acre, the corn was undamaged and the weeds were well controlled.

The use of the compounds as fire-retardant additives for resins is illustrated by the following example.

EXAMPLE 7

A polyester composed of 8.9 moles of trimethylolpropane, 5 moles of adipic acid and 1 mole of phthalic acid was cooked between 160 and 220 degrees centigrade until the acid number declined below 1. Then 5 parts of the product of Example 1, 20 parts of this polyester, 1.5 parts of water, 0.25 part of Emulphor EL719 (a polyoxyethylated vegetable oil which is a commercial emulsifying agent) and 0.1 part of N-methylmorpholine were mixed at room temperature. To this mixture were added 35 parts of the prepolymer formed by the reaction of 20 parts of the above polyester with 80 parts of toluene diisocyanate. The mixture was stirred thoroughly, poured into a mold, and allowed to expand and cure at room temperature to give a foam of 4 pounds/cu. ft. density. This foam in a standard test was classified as slow burning. A comparison foam made as above but omitting the product of Example 1 was classified as rapid burning.

Since many changes could be made in the above compounds and methods by one of ordinary skill in the art without departing from the scope of the invention, it is intended that all matter contained in the above description shall be illustrative and not in a limiting sense.

We claim:

1. A method for the control of plant growth in a locus which comprises applying to the locus a growth regulating amount of the compound having the formula

where at least one and a maximum of two of the substituents X, Y and Z is

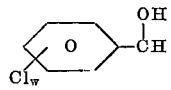

where $w$ is an integer between two and five and the remaining substituents are selected from the group consisting of hydrogen, alkoxy having from 1 to 12 carbon atoms, hydrocarbyl aryloxy having from 6 to 12 carbon atoms and no more than one hydroxy group, and the inorganic and unsubstituted lower alkyl ammonium salts of those compounds having hydrogen and/or hydroxy substituents on the phosphorus atom.

2. The process of claim 1 wherein the compound is diphenyl trichloro-α-hydroxybenzylphosphonate.
3. The process of claim 1 wherein the compound is bis (α-hydroxy-trichlorobenzyl) phosphinic acid.
4. The process of claim 1 wherein the compound is diethyl trichloro-α-hydroxybenzylphosphonate.
5. The process of claim 1 wherein the compound is diethyl 2,3,6-trichloro-α-hydroxybenzylphosphonate.
6. The process of claim 1 wherein the compound is dimethyl trichloro-α-hydroxybenzylphosphonate.

References Cited
UNITED STATES PATENTS

| | | | |
|---|---|---|---|
| 3,223,514 | 12/1965 | Gradsten | 71—86 |
| 2,174,019 | 9/1959 | Sullivan | 260—606.5 |
| 2,929,759 | 3/1960 | Gilbert et al. | 260—953 |
| 3,342,908 | 9/1967 | Birum | 260—953 |
| 3,350,192 | 10/1967 | Richter | 71—86 |
| 3,351,681 | 11/1967 | Deinet | 71—86 |

LEWIS GOTTS, Primary Examiner

G. HOLLRAH, Assistant Examiner

U.S. Cl. X.R.

71—76; 106—15; 117—136; 252—8.1; 260—502.4, 953